United States Patent [19]

Erickson

[11] Patent Number: 5,408,847
[45] Date of Patent: Apr. 25, 1995

[54] ROTARY SOLID SORPTION HEAT PUMP WITH EMBEDDED THERMOSYPHONS

[76] Inventor: Donald C. Erickson, 1704 S. Harbor La., Annapolis, Md. 21401

[21] Appl. No.: 67,786

[22] Filed: May 26, 1993

[51] Int. Cl.$^6$ .................. F25B 17/04; F25B 17/08
[52] U.S. Cl. .................................... 62/478; 62/480
[58] Field of Search .............. 62/478, 480, 106; 165/104.12

[56] References Cited

U.S. PATENT DOCUMENTS

| | | | |
|---|---|---|---|
| 1,472,432 | 10/1923 | Davenport | 62/478 |
| 1,790,757 | 2/1931 | Miller | 62/106 |
| 2,027,610 | 1/1936 | Nesselmann et al. | 62/119 |
| 2,041,741 | 5/1936 | Bichowsky | 62/179 |
| 2,293,556 | 8/1942 | Newton | 62/480 |
| 2,326,130 | 8/1943 | Kleen | 62/179 |
| 2,384,460 | 9/1945 | Kleen | 62/118 |
| 2,446,636 | 8/1948 | Coons | 62/118 |
| 2,452,635 | 11/1948 | Coons | 62/480 |
| 2,463,359 | 3/1949 | Daiger | 62/106 |
| 2,544,916 | 3/1951 | Coons | 62/480 |
| 2,596,523 | 5/1952 | Brace | 62/480 |
| 2,986,525 | 5/1961 | Hughes | 252/67 |
| 3,334,685 | 8/1967 | Burggraf et al. | 165/86 |
| 4,135,371 | 1/1979 | Kesselring et al. | 62/477 |
| 4,169,362 | 10/1979 | Weil et al. | 62/478 |
| 4,478,057 | 10/1984 | Lotz | 62/480 |
| 4,574,874 | 3/1986 | Duran | 165/43 |
| 4,595,774 | 6/1986 | Coste et al. | 556/118 |
| 4,623,018 | 11/1986 | Takeshita et al. | 165/104.12 |
| 4,660,629 | 4/1987 | Maier-Laxhuber et al. | 165/104.12 |
| 4,744,224 | 5/1988 | Erickson | 62/235.1 |
| 4,906,258 | 3/1990 | Balat et al. | 55/74 |
| 4,993,234 | 2/1991 | Korsgaard | 62/235.1 |
| 5,046,319 | 9/1991 | Jones | 62/46.2 |
| 5,057,132 | 10/1991 | Lebrun et al. | 62/4 |
| 5,079,928 | 1/1992 | Rockenfeller et al. | 62/106 |
| 5,083,607 | 1/1992 | Lebrun et al. | 165/104.12 |
| 5,157,937 | 10/1992 | Choung et al. | 62/324.2 |
| 5,174,367 | 12/1992 | Nasako et al. | 165/104.12 |
| 5,279,359 | 1/1994 | Erickson | 165/104.12 |

Primary Examiner—Henry A. Bennet
Assistant Examiner—William C. Doerrler

[57] ABSTRACT

A rotary sorption heat pump for heating or cooling comprised of a plurality of sorption modules, each of which has at least two different zones of heat and mass transfer. The sorption modules are mounted to a frame which is adapted for rotation. Thermosyphons are used to transfer heat between different zones of sorption modules.

21 Claims, 7 Drawing Sheets

FIG. 4A
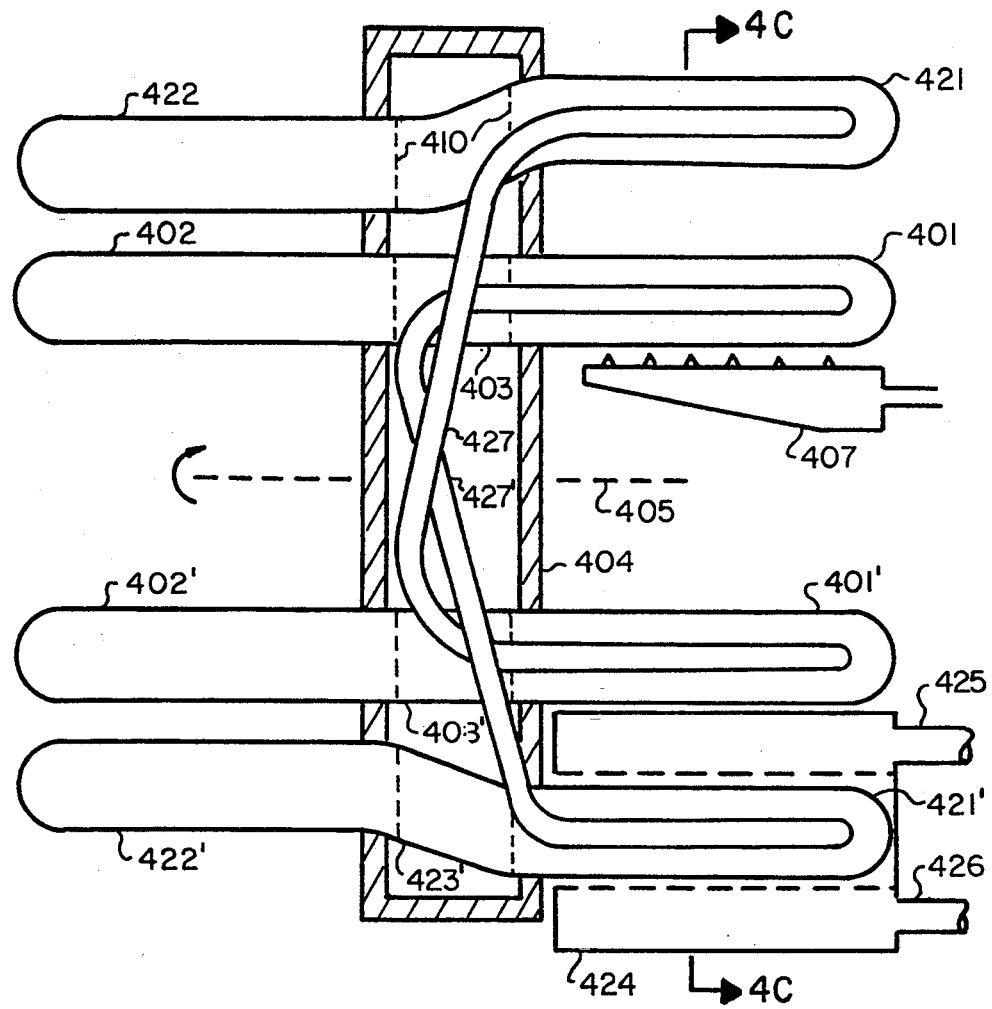
FIG. 4B
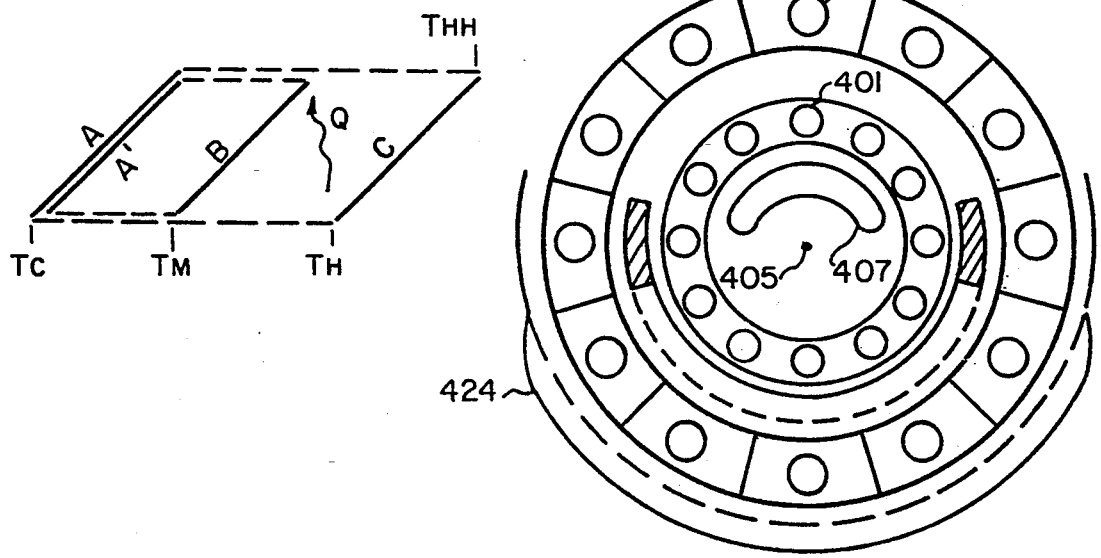
FIG. 4C

ROTARY SOLID SORPTION HEAT PUMP WITH EMBEDDED THERMOSYPHONS

BACKGROUND ART

Thermally activated heat pumps based on the absorption principle hold great promise for meeting the combined environmental goals of higher energy efficiency (reduced $CO_2$ emissions) and zero ozone depletion for space conditioning applications. However, the joint achievement of high efficiency, simplicity, and low cost has heretofore proved to be elusive.

The use of solid sorbents in single-effect intermittent cycle heat pumps or refrigerators is well known. Beyond the generic advantages of all sorption cycles (no compressor, actuated by heat vice shaft power, and no use of CFCs), solid sorbent use presents the added advantages that no sorbent or refrigerant pumps or valves are required (in certain configurations) and the sorbent is reasonably well localized. There are, however, many disadvantages: high latent heat of sorption causes very low coefficient of performance (COP); achieving continuous heat flow requires multiple units connected via complex valving arrangements; the heat release rate tends to be highly uneven, and that coupled with the periodic requirement to change between absorb and desorb results in substantial idle or lightly loaded periods. To compensate for the light load periods, the apparatus must be highly loaded the remainder of the time, and the highly loaded periods determine the heat exchange surface requirements. An additional disadvantage for solid absorbents (chemisorbents) is their monovariant equilibrium, i.e., pressure is solely a function of temperature, and not of refrigerant (sorbate) content. Thus each solid absorbent operates at a unique lift (relative to the pure refrigerant), and if the lift requirement changes, e.g., due to varying ambient temperature, the sorbent cannot adjust.

Yet another problem with historical chemisorbents was that the characteristic extreme sorbent volume changes (shrinking and swelling) caused the sorbent bed to compact and deactivate. That problem was largely overcome by either of two techniques. In the first technique, the chemisorbent was combined with additions of either viscous liquid ($LiNO_3$) and/or of various inert conductive media, especially intricate porous structure such as activated carbon or exfoliated graphite. Prior art disclosures of this technique are found in U.S. Pat. Nos. 2,986,525 and 4,595,774. In the second technique, the salt is prevented from swelling to its full extent, and is kept compressed within a volume smaller than that which it tends to occupy. The resulting pressure exerted on the salt by the container causes tile salt to take up a fixed position which is not shifted during desorption. This ensures more rapid reaction and good heat transfer. The compressed condition of the salt is achieved by partially loading the container with granular desorbed salt and then absorbing in situ until the reactor is full of solid, and then absorbing a minor additional amount. This technique is disclosed in U.S. Pat. Nos, 2,326,130 and 2,384,460.

For direct-fired space-conditioning applications, the most severe limitation of single-effect solid sorbent intermittent cycles is the low COP. As a result, various multi-effect cycles have been proposed. Unfortunately, they have also increased complexity, by any of several mechanisms: a) sorbate valves and/or throttles; b) sorbent-to-sorbent heat exchange through heat transfer loops comprised of two heat exchange surfaces and pump(s) and/or valves; c) complex heat transfer loop valving; d) excessive generator temperature requiring use of hot oils having poor heat transfer characteristics; and e) multiple sorbent beds are interconnected in conjunction with more sorbate than one sorbent bed can hold, which risks liquefying one of the sorbent beds at shutdown or abnormal conditions (all the sorbate migrates to the highest affinity sorbent).

Examples of disclosures of multi-effect solid sorbent heat pumps and their attendant complexities from the above list are: U.S. Pat. No. 5,083,607 (be); U.S. Pat. No. 5,057,132 (abe); U.S. Pat. No. 5,079,928 (abcde); U.S. Pat. No. 5,025,635 (abcde); U.S. Pat. No. 5,174,367 (bc); and U.S. Pat. No. 5,046,319 (abc). Multiple effect heat pumps based on hydrides also experience the above difficulties, e.g., U.S. Pat. Nos. 4,623,018 and 5,174,367.

Rotary sorption heat pumps have been proposed. By arranging a multiplicity of single-effect intermittent cycle sorption zones or modules on a rotating frame, it is possible to achieve continuous heat pumping without either sorbent valves or heat transfer valves. Examples are disclosed in U.S. Pat. Nos. 4,169,362, 4,478,057, 4,574,874, 4,660,629, and 5,157,937.

Thermosyphons (also known as gravitational heat pipes) are frequently used to supply heat to or remove heat from intermittent sorption cycles. The thermosyphon may be hermetically separate from the sorption cycle, as in U.S. Pat. Nos. 2,544,916, 2,596,523 and 4,993,234. Alternatively the thermosyphon can be integrated directly into the sorption cycle, using a common working fluid and a common component, as in U.S. Pat. Nos. 2,446,636, 2,452,635, and 4,744,224. Also known are three-way thermosyphons, wherein one component is alternately a sink receiving heat from an external supply and then a source delivering heat to a different external sink, as in U.S. Pat. No. 2,293,556. Recently two new uses of thermosyphons in intermittent sorption cycles have been disclosed. In U.S. Pat. No. 5,083,607, a valved stationary thermosyphon transfers latent heat from one chemisorbent to another during one step of a two-step cycle, making possible a double-effect cycle. In U.S. Pat. No. 5,157,937, valveless rotating thermosyphons exchange sensible heat between two beds of the same adsorbent (also known as physisorbent), thus reducing changeover sensible heat losses and increasing COP. The two ends of the thermosyphon are effectively mirror images of each other, and each does the same two things. The rotation causes the thermosyphon to reverse direction of heat flow, i.e., heat flow is always from whichever end is lower to the other higher end. Both of the above disclosed thermosyphons are hermetically isolated from the sorption cycle.

What is needed, and included among the objects of this invention, are apparatus and corresponding process for at least one of heat pumping, refrigeration, and space conditioning, which apparatus achieves the simplicity and constant duty of rotary cycles, plus preferably also the high COP of multi-effect cycles, without the complications of refrigerant valves or seals, or of heat transfer liquid pumps, valves, or seals. It will preferably have a capability of being directly fired, while positively avoiding combustion gas contamination of heating air, and with no requirement for pumped circulation of hot oil. It will preferably achieve direct heating and/or cooling of conditioned space air with no intervening heat transfer liquid loop, and with minimal refrigerant distributed in multiple hermetically separate modules whereby the maximum refrigerant leakage possible from any single leak is essentially insignificant.

The apparatus will, in the multiple-effect embodiments, preferably transfer internal heat valvelessly from module to module, using rotation to appropriately turn the thermosyphon on and off. The newly disclosed multi-effect embodiments will preferably be simpler and more efficient than existing multi-effect embodiments.

Another objective is to disclose advantageous new multi-effect configurations which can be applied in stationary embodiments in addition to or in lieu of rotary embodiments.

Disclosure of Invention

In its most basic aspect, this invention comprises the combination of a rotary sorption heat pump plus embedded valveless thermosyphons which exchange heat between one sorbing media and at least one of an external heat transfer fluid and a different sorbing media. Sorbing media is broadly defined so as to include the condensing/evaporating pure refrigerant as well as various solids. The rotary sorption heat pump is preferably comprised of a plurality of individual hermetic modules, each comprised of at least two zones of refrigerant heat and mass transfer, each zone comprised of a different sorbing media. The heat and mass transfer zones of each module are preferably of elongated cylindrical shape, with diameter between 1 and 20 cm. The support frame support the modules at the points of connection between the active heat and mass transfer zones. Thus those zones protrude out from each side of the frame. Frame rotation causes those zones to rotate along a circular path having the shape of a cylindrical surface. Fixed structure is inserted inside and/or outside the rotating surface to convey heat transfer fluids to and from contact with the rotating zones. Each zone is heated by one fluid in one portion of its arc of travel and cooled by another fluid in another portion of its arc of travel. Appropriate modules are interconnected by respective thermosyphons such that rotation causes the thermosyphon to turn on and off at appropriate points of the multi-step operating sequence. The thermosyphon can be hermetically separate from the sorption cycle, but in certain configurations it can alternatively advantageously be integrated, sharing both working fluid (refrigerant) and a heat exchange component with one of the modules it serves.

Each multi-sorption module is a valveless hermetic enclosure having multiple non-adiabatic sorption zones and a refrigerant (sorbate), each zone comprised of a sorbing media of differing affinity for the refrigerant, and wherein the low affinity media can be either a solid sorbent or simply the pure refrigerant alternating undergoing condensation and evaporation. The di-,tri-, and quadri-sorption modules respectively have two, three, and four zones of differing sorbate affinity, and respectively operate in a two, three, or four step operating sequence. As an example, copending U.S. patent application 905,284 filed Jun. 26, 1992 by Donald C. Erickson discloses rotary sorption heat pumps comprised of a multiplicity of trisorption modules, which are operated in a three step repeating sequence. Rotary motion sequences each zone of each module past respective fixed air ducts to accomplish the three step sequence.

Beyond the above basic combination, the disclosed invention extends to several novel subcombinations: 1) a rotary integrated thermosyphon in any type of heat exchanging apparatus; 2) multi-effect sorption cycles comprised of a plurality of clusters of multisorption modules with internal module-to-module heat exchange within each cluster; 3) rotating thermosyphons with adiabatic reservoirs which allow the thermosyphon to turn off in one orientation; 4) transferring product heat of a rotary heat pump via thermosyphon from a combustion gas contaminated region to a separate conditioned air region; 5) new multieffect solid sorption cycles based on three different sorbing media; and 6) rotary heat pumps with three or more effects.

For example, under 2) there are the following disclosures: a) each cluster comprised of three different disorption modules, plus two "high-to-high" internal heat exchanges; b) each cluster comprised of a disorption and a trisorption module; c) at least one module of each cluster comprised of a condensation/evaporation zone.

The preferred chemisorbents for use in the practice of this invention include the alkaline earth metal salts and the transition metal salts, especially the halide salts, most especially $CaCl_2$, $SrCl_2$, $BaCl_2$, $CrCl_2$, $MnCl_2$, $FeCl_2$, $CoCl_2$, $NiCl_2$, $CuCl_2$, $CuCl$, $ZnCl_2$, plus the corresponding bromides, and $VF_3$, $Na_2S$, ettringite, and $AlCl_3$. The preferred ligands (sorbates) for the above chemisorbents are $NH_3$ and $H_2O$, plus in some instances $CH_3OH$ and $SO_2$. Other chemisorbents listed in U.S. Pat. Nos. 2,041,741 or 4,906,258 are also useful. Various hydrides also find use as the chemisorbents when $H_2$ is the sorbate. The preferred physisorbents are activated carbon and molecular sieve, however, others such as silica gel, ettringite, fullerenes, and activated alumina also find occasional advantageous use. The above sorbates apply to physisorbents as well, plus the addition of halogenated hydrocarbons, especially hydrofluorocarbons.

The single-effect cycles find application in waste heat powered applications, e.g., vehicular air conditioning using exhaust gas as the heat source. They also find application in high lift scenarios, either gas-fired, electric heated, or waste heat powered. Examples are hot water heater heat pumping and very low temperature industrial refrigeration. The single-effect cycles may be comprised of either chemisorbent or physisorbent, including mixtures.

The triple-effect (3 E) cycles find application in low to modest lift scenarios, e.g., stationary space conditioning (cooling and/or heating). The double-effect cycles can be applied either way, ie., as a more efficient replacement for 1 E cycles or a lower capital cost/lower efficiency replacement for 3 E cycles.

All of the cycles can also be operated in "reverse" mode as well, i.e., as temperature amplifiers (also known as heat transformers), by reversing the direction of all heat flows.

BRIEF DESCRIPTION OF THE DRAWINGS

FIGS. 4A, 4B, 4C and 5A, 5B, 5C, 5D illustrate several concentration staged double effect embodiments.

BEST MODE FOR CARRYING OUT THE INVENTION

Figure 1A:
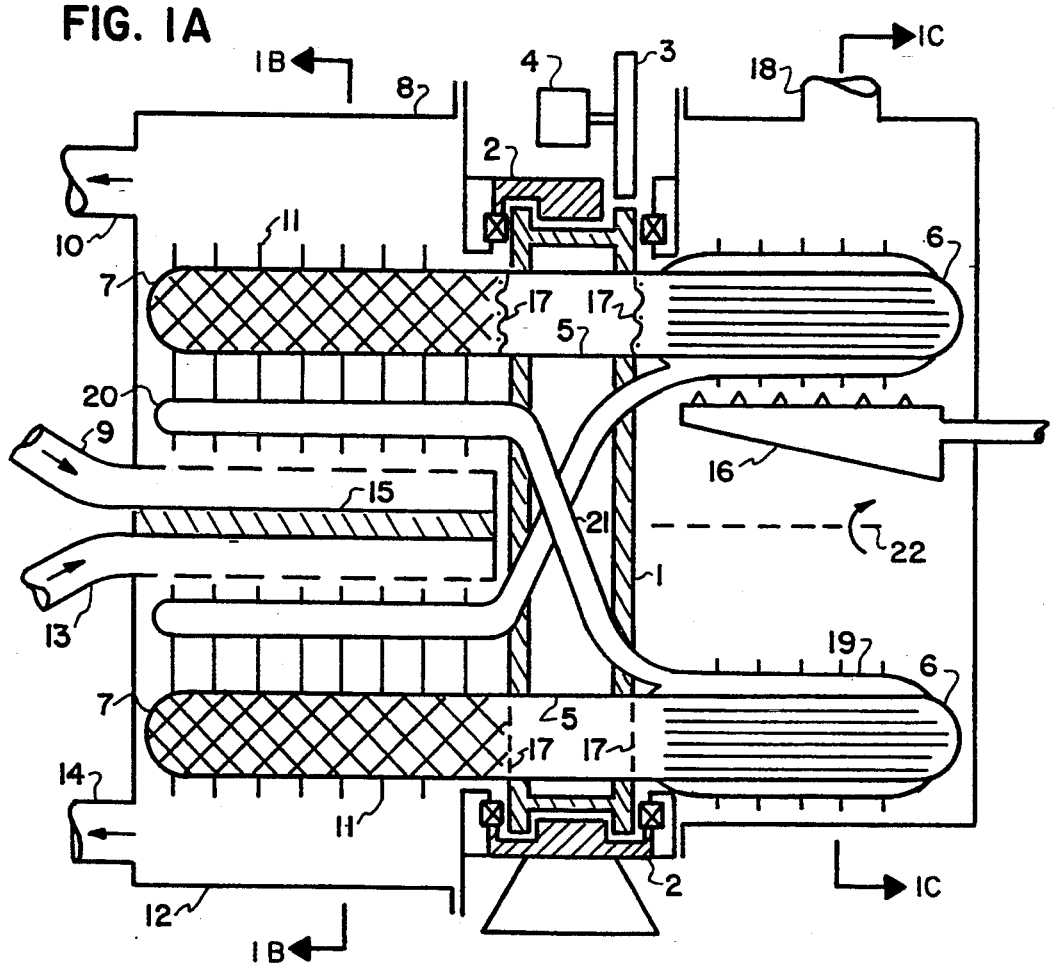
FIGS. 1A, 1B and 1C illustrate a single effect rotary solid sorption heat pump with a plurality of disorption modules, each comprised of two different chemisorbents, each module having a thermosyphon for transferring sorption heat to the air being warmed, and where one end of the thermosyphon also tempers the input heat.
Figure 1B:
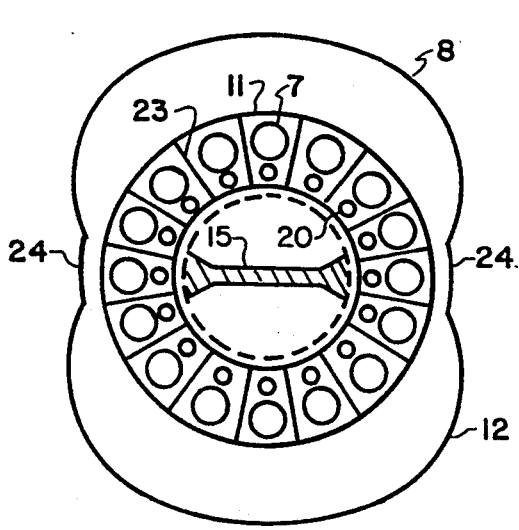
Figure 1C:
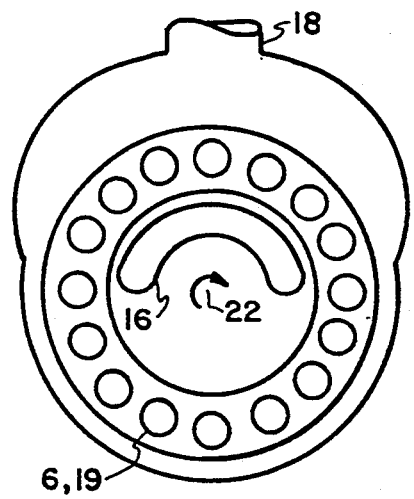

Referring to FIGS. 1A, 1B, and 1C, a rotary single-effect multimodular disorption heat pump is illustrated which has embedded thermosyphons for transferring heat of sorption to an external sink. The apparatus is shown in elevation cross section from the side (FIG. 1A) and also from each end (FIGS. 1B and 1C). Rotating frame 1 is mounted in fixed track 2, which provides both bearing surfaces and air sealing surfaces. Frame 1 is caused to rotate by rotational drive member 3 and motive source 4, e.g., a gear and motor respectively. A plurality of disorption modules 5 are mounted equally spaced around the periphery of frame 1 with portions of each module protruding from each side of the frame. Each disorption module is a hermetically sealed vessel containing a sorbate and two zones 6 and 7 for both mass transfer of said sorbate and heat transfer with an external fluid. Heat and mass transfer zone 6 contains a solid sorption media having a high affinity for the sorbate, e.g., a chemisorbent and/or a physisorbent. Zone 7 contains a different solid sorbent having a lower affinity for the sorbate.

Fixed air duct 8 and associated supply and return ports 9, 10 direct air in heat transfer contact with those zones 7 in the upper portion of their rotational path. Air-side heat transfer enhancement such as fins 11 would normally be incorporated for improved performance. Similarly, fixed air duct 12 and associated supply and return ports 13, 14 direct another air stream in heat transfer contact with zones 7 in the lower portion of their rotational path. Normally the upper air stream is heated while traversing the rotating zones 7, and the lower air stream is cooled, hence, their fixed separation boundary 15 should be a least lightly insulated.

On the other side of mounting frame 1, a source of high temperature heat 16 heats those zones 6 which are in the upper half of their arc of travel. A porous retaining wall 17 is shown at the boundary of each sorbent zone. As disclosed in the prior art, it is important that the sorbents are constrained in a fixed position within their containment walls, not free to move about. For chemisorbents, the starting granular salt is charged in an amount such that the swelling accompanying initial absorption and expansion will cause it to completely fill the available space inside the retaining wall, plus slight additional absorption which causes it to exert pressure. Then it will retain that fixed structure during subsequent desorption. A small inclusion of $LiNO_3$ assists this effect. For physisorbents, it is beneficial to compact them beyond their natural density, and the retaining wall preserves the compaction.

When heat source 16 is a combustion device, it is useful to have exhaust flue 18 to carry away the products of combustion.

In the heating mode, approximately half of the useful heat originates in zones 6 in the lower half of their travel. Since they are surrounded by combustion gas, it would not be desirable to cool them directly with the air being heated. Hence thermosyphons are used to convey that heat to where the same ducts 9, 10 which pick up heat from zones 7 (in the upper half of their travel) will also pick up the heat from zones 6. In particular, sleeve 19 holds the boiling thermosyphon heat transfer fluid in thermal contact with zone 6; heat transfer tube 20 contains condensing thermosyphon heat transfer fluid which is cooled by airflow thru ducts 9 and 10; and connecting tube 21 allows upward vapor flow and gravity return liquid flow. Each zone 6 has such a thermosyphon.

Since the thermosyphon (19, 20, 21) only operates when the lower end is hotter than the upper end, each thermosyphon turns off as its associated zone 6 rotates above the axis of rotation 22. In that location, the zones 6 become quite hot due to heating source 16. With the shown construction of sleeve 19 of the thermosyphon, another function becomes possible in this step. If the thermosyphon contains enough liquid to completely fill tubes 20 and 21 and also partially fill sleeve 19, then in the heating mode the heat transfer fluid ensures even heating of zone 6, avoiding hot spots. This is important for some sorbents which are susceptible to either melting or thermal decomposition from high wall temperatures.

In order to minimize the mixing of the cooled air stream thru ducts 13, 14 and the heated air stream thru ducts 9, 10, dividing partitions 23 are positioned longitudinally between each pair of zones 7. Also, blocking segments 24 are positioned between the respective air plenums 8 and 12, with the blocking segments having a width at least equal to the spacing width of partitions 23. Partitions are not necessary on the zone 6 side when only a single heat transfer gas is on that side.

Since the various tubes 21 and module 5 midsections within frame 1 are at different temperatures but are not intended to exchange heat, it is advantageous to fill the interior of frame 1 with an insulating material.

In operation of the FIG. 1A heat pump, frame 1 is rotated when flame 16 is burning, and cooled air flows 13 to 14 while warmed air flows 9 to 10. Zones 6 being heated by flame 16 (in the upper half of the arc) desorb and their associated zones 7 absorb, releasing heat to the warmed air flow. Desorption is complete as zones 6 rotate beyond flameholder 16, and then thermosyphon 19 begins cooling the zones 6 as they progress thru the bottom half of travel. Now the air being cooled supplies low temperature heat to zones 7 in the bottom half of their travel, causing them to desorb and return gaseous sorbate to zones 6, where medium temperature heat of absorption is being removed by thermosyphon 19. This step of the sequence continues until zone 6 rotates back to the upper half of its arc of travel, where the thermosyphon 19 stops cooling it and flame 16 once again heats it, thus completing the cycle.

Figure 2:
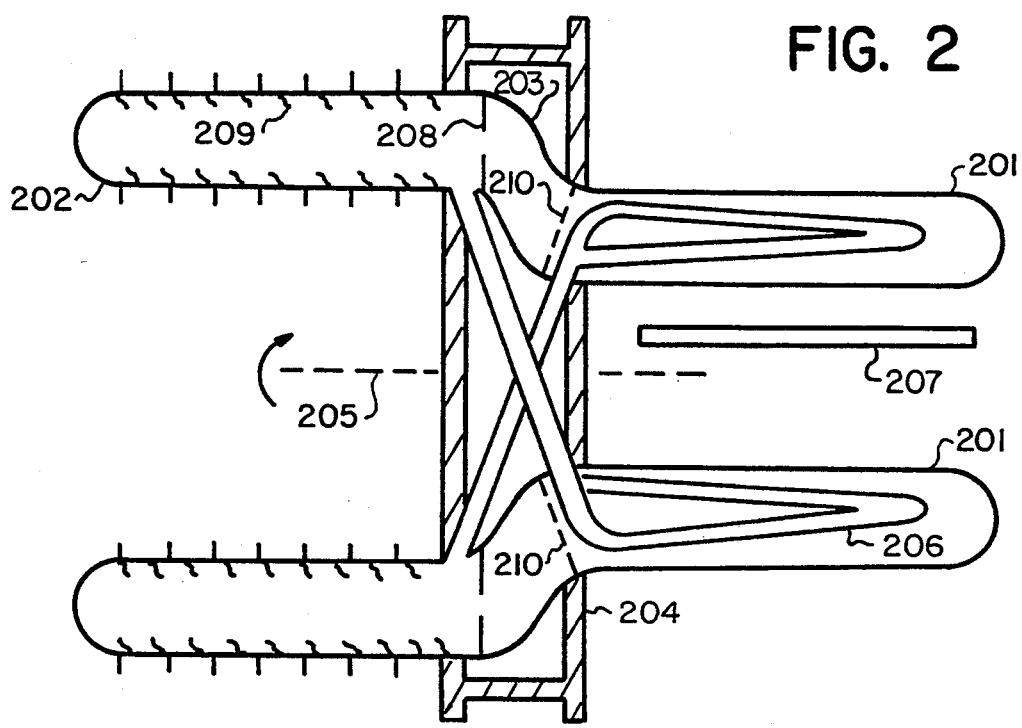
FIG. 2 is a solid sorption single effect rotary heat pump rotor wherein the disorption modules contain only a single sorbent, and wherein the condenser/evaporator end of each module also forms an integral part of the thermosyphon of an opposite module.

FIG. 2 illustrates several additional advantageous variations which are possible with only a single type of disorption module. In FIG. 2, each disorption module is comprised of a zone 201 of high chemical affinity for the sorbate, a zone 202 adapted for condensation and evaporation of the sorbate, and a connecting section 203. All the disorption modules are mounted in frame 204 which is adapted for rotation. Connecting section 203 includes a double bend whereby the arc formed by the plurality of zones 201 is closer to the axis of rotation 205 than is the arc formed by zones 202. This can be advantageous when it permits a smaller heat source 207

(e.g., electric heater) to be utilized. The high affinity zones 201 are fitted with one end 206 of a thermosyphon, in this instance inside the sorbent containment. The other end of the thermosyphon is integral with the condenser/evaporator 202 of one of the other disorption modules-zone 202 becomes the cold end of the thermosyphon when its elevation is higher than end 206, and condensed sorbate from zone 202 enters end 206. Conversely, when end 206 rotates to an elevation higher than zone 202, condensed sorbate drains out of end 206 back to the lower zone 202, which at that point becomes an evaporator. Since liquid sorbate is present much of the time in the plurality of condenser/evaporators 202, it will be desirable to have a weir 207 which prevents liquid spillover to zone 201, and also capillary or wicking material 209 which will distribute the liquid over the interior heat exchange surface of the zone. Similarly, the sorbent material is retained within zone 201, preferable under some tension, by retaining screens 210. FIG. 2 also illustrates an option for the thermosyphon configuration in contact with the sorbent: a recirculation path which promotes rapid circulation of two phase mixture and hence better heat transfer coefficients. Note that FIG. 2 only illustrates the rotating portion of the heat pump plus the heater. The solid sorbent can be either chemisorbent or physisorbent.

Figure 3:
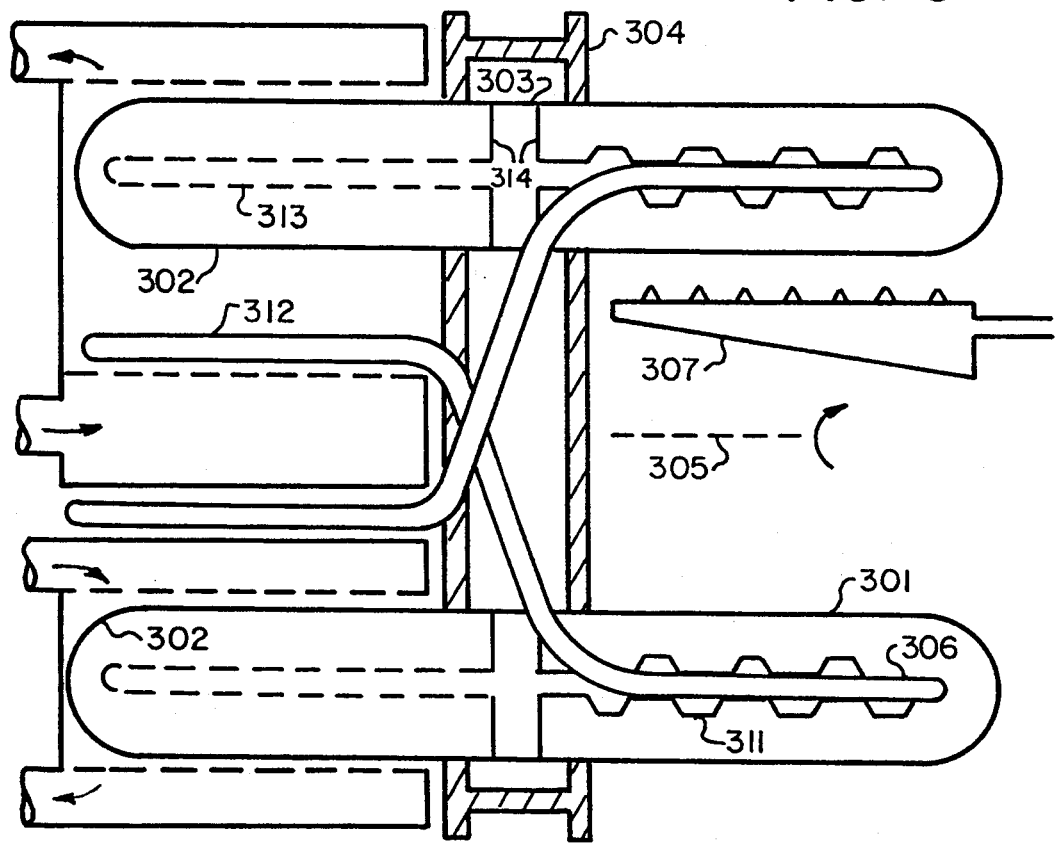
FIG. 3 is another single effect embodiment showing yet another possible thermosyphon configuration and a different configuration of fixed air ducting.

FIG. 3 illustrates several more advantageous alternative constructions in a single effect embodiment. In FIG. 3, the disorption modules are comprised of high affinity zones 301, low affinity zones 302, and connecting sections 303, and are mounted in frame 304, which rotates about axis 305. Thermosyphon hot ends 306 are located within the high affinity sorbent containment 301, and in this instance are shown as a simple cylinder. Fluted or corrugated tubing 311 is pressed onto hot end 306, and has perforations which allow sorbate vapor good access to the compressed sorbent. The thermosyphon cold ends 312 are located on the "clean" side of frame 304. Those in their upper arc of travel are cooled by the air stream being warmed, whereas those in the lower half of the arc are in an idle space. Thus ends 312 are not wastefully cooled to low temperature in the bottom portion of their travel.

The low affinity sorbent media in each zone 302 has a perforated tube 313 centrally located to allow vapor communication, plus sorbent retaining wall 314.

Whereas FIGS. 1A, 2, and 3 all illustrate single effect cycles where the thermosyphon exchanges heat between a sorbent and an external sink, FIGS. 4A, 5A, 5B, 5C, and 5D illustrate double effect cycles wherein at least one group of thermosyphons exchanges internal latent heat so as to cause the double effect operation. Each cycle is comprised of a plurality of pairs of disorption modules. The internal thermosyphon exchanges latent heat between different sorbents (or sorbing media). As in FIGS. 1A, 2, and 3, the modules are arranged circumferentially in a rotatable frame. It is convenient, although not essential, to locate the two different types of modules at different radial distances from the axis, as will be seen.

Referring to FIG. 4A, the elevation cross section of the double effect rotary disorption heat pump shows rotating frame 404 and axis 405, plus fixed heat source 407. The disorption modules are provided in pairs; each pair comprising a higher temperature module 403 comprised of high affinity zone 401 and low affinity zone 402, plus a lower temperature module 423 comprised of high affinity zone 421 and low affinity zone 422. The high affinity zones contain solid sorbent, whereas the low affinity zones contain a sorbing media which can be either a different solid sorbent or the pure sorbate (i.e., a condenser/evaporator). FIG. 4A illustrates one pair of disorption modules 403 and 423 at the top of their arc of rotation, and another pair 403' and 423' at the bottom of their arc of rotation. Screens 410 or other similar retaining devices restrain the sorbent in fixed position.

FIG. 4B illustrates the pressure-temperature state points of this double effect cycle. The low temperature modules (423 and 423') have sorbing media A and B (in zones 422 and 421 respectively) and the high temperature modules 403 have sorbing media A and C in zones 402 and 401 respectively. In the two step operating sequence, the pair A–C in module 403 is initially at high pressure, C being heated at $T_{HH}$, desorbing to A which generates heat at $T_M$. At the same time, the sorbing pair A–B (in module 423') has cold heat applied to A, causing it to desorb at low pressure, while B is absorbing and generating heat at $T_M$. When the low pressure A and the high pressure C are fully desorbed, they rotate into the second step of the two step operating sequence. In that step, the A–C pair drops to low pressure, and cold heat is applied to A, causing it to desorb and C to absorb at $T_H$. Absorption heat from C is transferred to the B end of the A–B pair raising that pair to high pressure and causing B to desorb. The sorbate desorbed from B is absorbed in A, generating heat at $T_M$.

The heat flows necessary to cycle each sorbing pair through its two step operating sequence are provided as illustrated previously. Zones 402 and 422 are cooled at $T_M$ by an air stream being warmed. Zones 402' and 422' are heated at $Ta_c$ by an air stream being cooled. In the double effect cycle, zone 421' (sorbent B at low pressure) must also be cooled at $T_M$, and that is accomplished by air flow thru fixed duct 424, including supply and return ports 425 and 426. Prime input heat at $T_{HH}$ (hotter than $T_H$) is supplied by heat source 407. Finally, there is also required the internal transfer of heat at. $T_H$ from low pressure C (zone 401') to high pressure B (zone 421). That is accomplished by embedded thermosyphon 427, as long as zone 421 is higher than zone 401'. When the modules plus thermosyphon rotate beyond that point, e.g., as thermosyphon 428', where 421' is now lower than 401, the thermosyphon turns off, since 401 is being heated to a higher temperature than 421'.

By exhausting the hot combustion gas which has heated zone 401 past zone 421, some additional heat can be recovered from the hot exhaust to good benefit.

FIG. 4A achieves the goal of multieffect operation with no valves or pumps in the sorption system and also no heat transfer liquid valves or pumps. However, it has the drawback that zone 421 is exposed to exhaust gas, which thereby will mix in with the air being warmed in plenum 424. Thus, as shown, it is only suitable for air conditioning, not heat pumping. It would be possible to reduce the exhaust contamination by restricting the combustion gases to zones 401. However, a preferred solution is to use thermosyphons to transfer the useful heat to clean zones, as was done in FIGS. 1A, 2, and 3. That solution is illustrated in FIG. 5A.

Figure 5A:
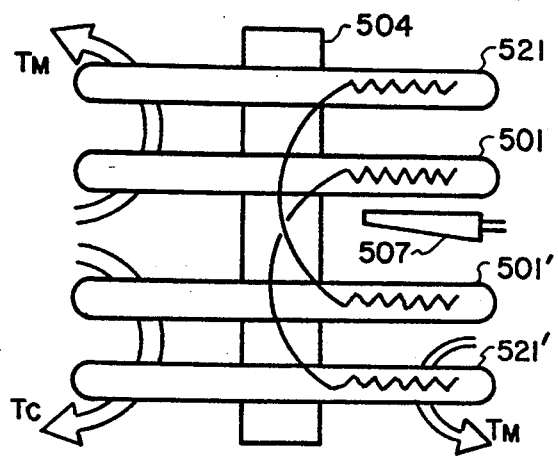

FIG. 5A is a shorthand notation for FIG. 4A, with the 5XX numbered components corresponding to their 4XX counterparts. It has only internal extent heat exchange thermosyphons 527 and 527', and hence part of the useful heat at $T_M$ is released on the combustion side of barrier (frame) 504.

Figure 5B:
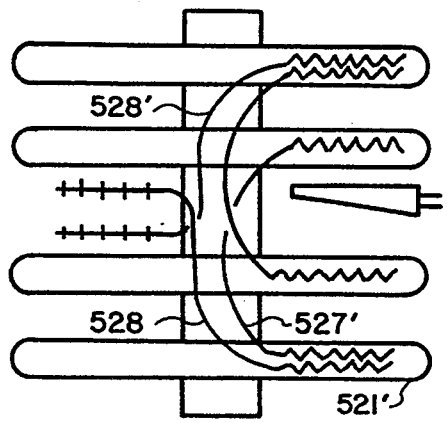

FIG. 5B adds external cooling thermosyphons 528 and 528' to the FIG. 5A configuration, thus transferring the heat at $T_M$ in zone 521' into the clean air stream. Thermosyphon 528' is shown rotated into the turned off position.

Figure 5C:
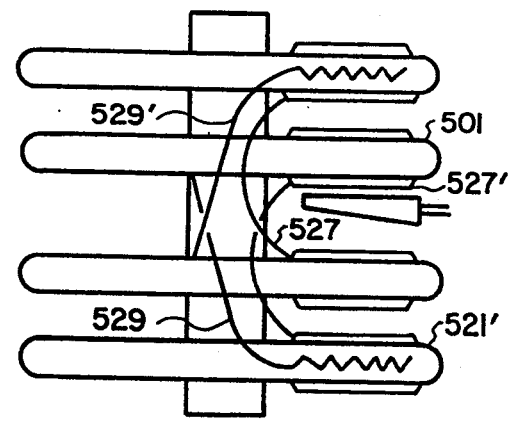

FIG. 5C shows how other alternative thermosyphon options might be beneficially applied to this objective. In this case sorbing media A of the A-C pair must be a liquid, and heat at $T_M$ from zone 521' is transferred via integral thermosyphon 529. 529' is the corresponding one rotated to the off position. Also, thermosyphons 527 are shown comprised of sleeves so they can provide the heat tempering function in their off position (527').

Figure 5D:
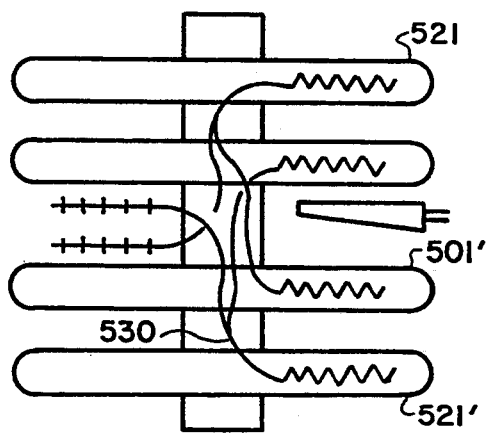

Finally FIG. 5D illustrates a double effect configuration which is functionally the same as FIG. 5B, but each pair of thermosyphons 528 and 527' has been combined into a single dual use thermosyphon 530. Thus instead of two thermosyphon ends being required in zone 521', only one is required. In one orientation, heat at $T_M$ is transferred out of zone 521' to the external air stream, and in the other orientation heat at $T_H$ is transferred into zone 521 from zone 501'.

Figure 6A:
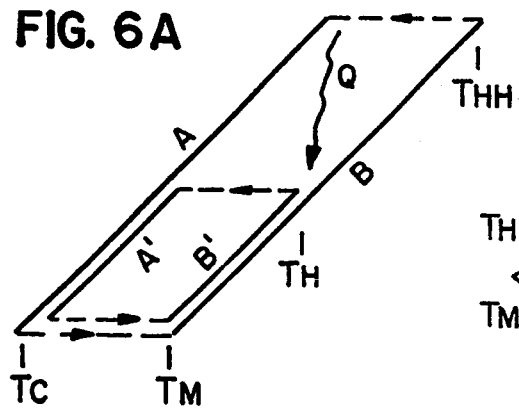
FIGS. 6A, 6B, 6C, and 6D illustrates several pressure staged double effect embodiments.
Figure 6B:
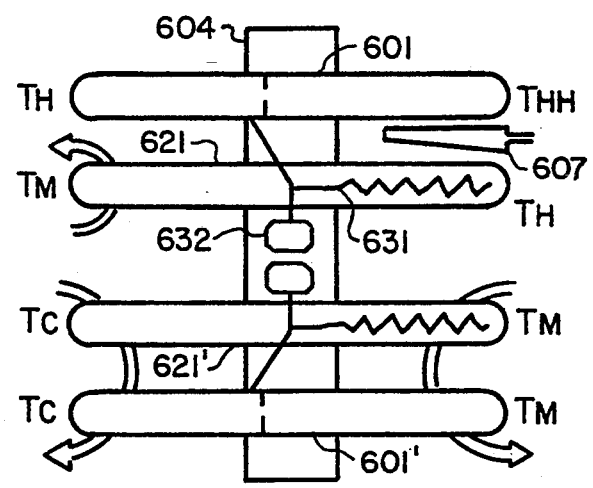
Figure 6C:
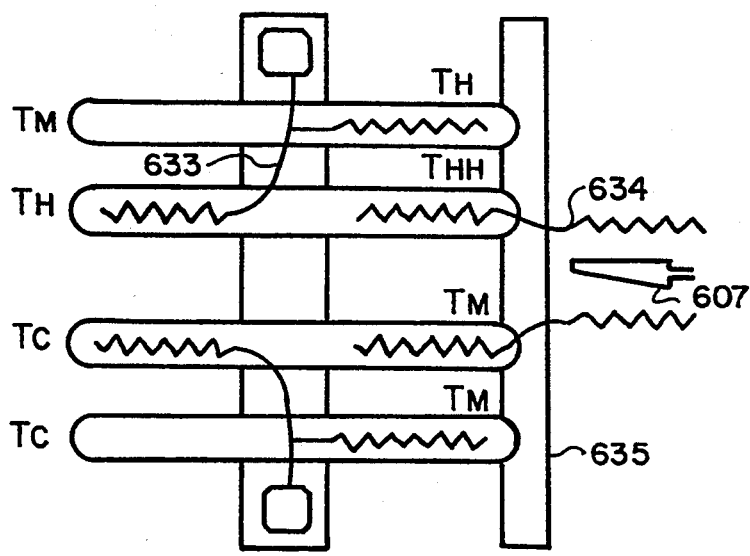
Figure 6D:
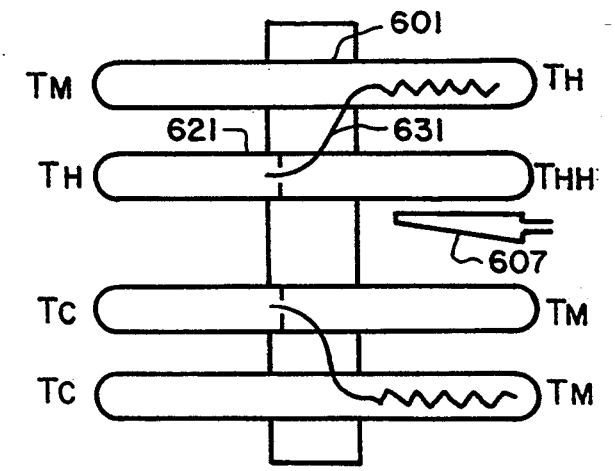

The double effect configurations illustrated in FIGS. 4A, 5A, 5B, 5C, and 5D are concentration staged. It is also possible to stage the effects via pressure. FIGS. 6B, 6C, and 6D illustrates pressure staged double effect configurations. FIG. 6A shows the generic thermodynamic state points. In this type of cycle, both of the sorbing pairs (A-B and A'-B') have approximately the same lift. The A-B pair is cycled through a larger pressure change than the A'-B' pair, such that absorbing A at high pressure can supply heat to desorbing B' at its high pressure and at $T_H$.

FIG. 6B shows disorption modules 601 and 601' which contain the A-B pair; modules 621 and 621' which contain the A'-B' pair; all contained in rotating frame 604. Heat source 607 heats the B end of module 601 in the upper half of its travel. When A is the pure sorbate, integrated thermosyphon 631 connects high pressure sorbate vapor to heat the B' end of module 621, and the condensate collects in reservoir 632. When frame 604 rotates to where 632 is above 601, the condensate drains back to the evaporator end of the module.

FIG. 6C substitutes closed thermosyphon 633 for the integrated thermosyphon of FIG. 6B, thus enabling sorbing media A to be a solid thermosyphon of FIG. 6B, thus enabling sorbing media A to be a solid sorbent. Also FIG. 6C shows an external heat addition thermosyphon 634, plus a second barrier (rotating frame) 635, which keeps combustion products from heat source 607 separated from the air being warmed, thus enabling a heat pumping mode.

FIG. 6D illustrates a configuration similar to FIG. 6B but with two advantageous changes. Module 601 recovers waste heat from the exhaust from heat source 607; and the integrated thermosyphon 631 connects to an axial location of the condenser/evaporator of module 621, rather than to its periphery. Thus reservoir 632 is no longer necessary—the condenser/evaporator forms the reservoir.

Figure 7B:
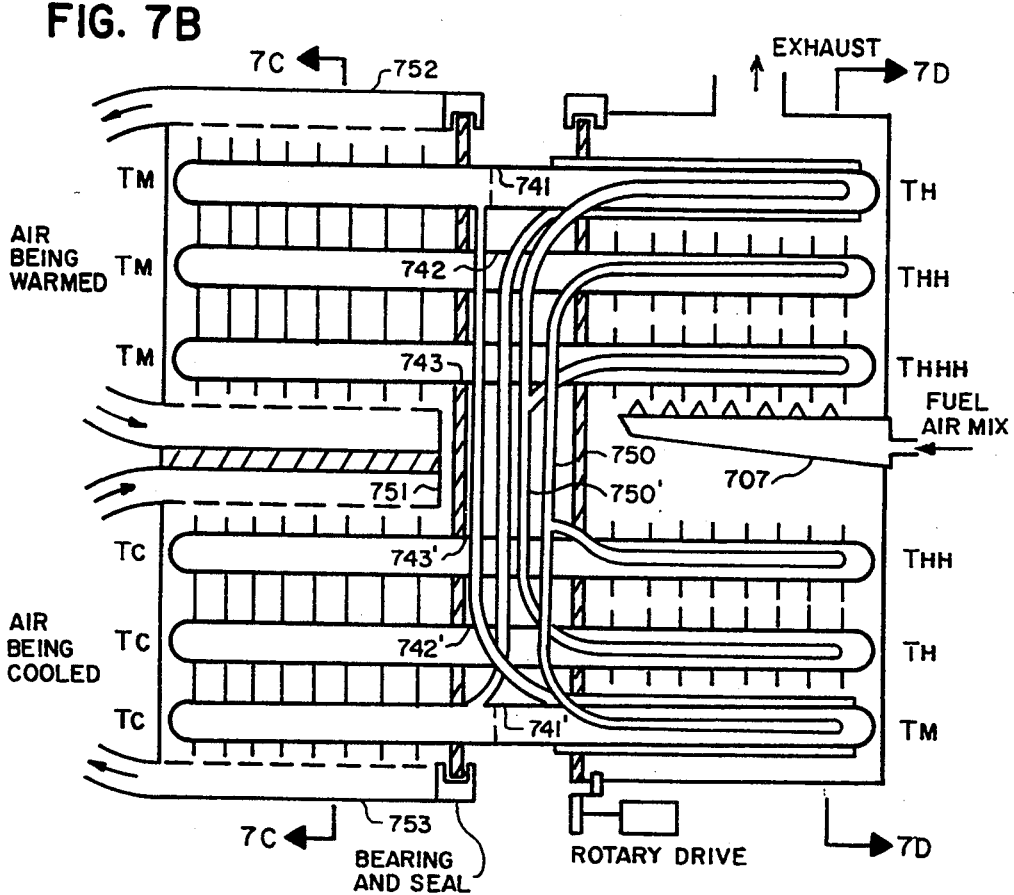
FIGS. 7A, 7B, 7C, and 7D illustrates Concentration staged triple effect.
Figure 7A:
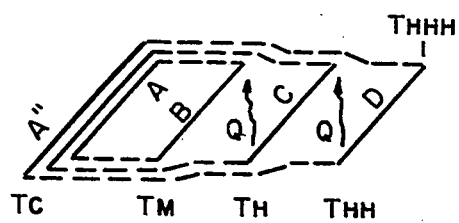
Figure 7C:
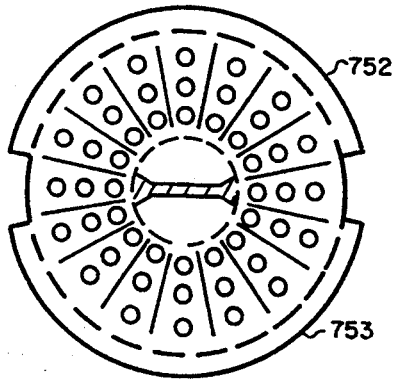
Figure 7D:
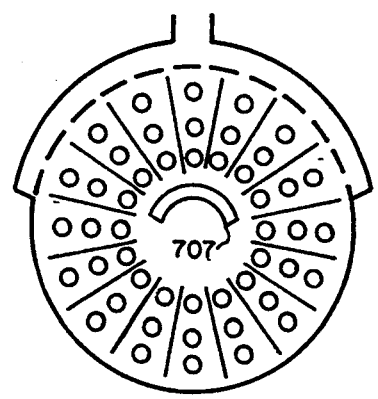

FIG. 7A, 7B, 7C, and 7D illustrates a concentration staged triple effect cycle, implemented by a plurality of clusters of three disorption modules which rotate. FIG. 7A shows the thermodynamic state points: three sorbing pairs (A-B, A'-C, and A"-D) cycle between approximately the same pressures, and two internal latent heat exchanges are present: D to C and C to B. FIG. 7B is the elevation cross section, showing rotary frame 704, heat source 707, and the cluster of three types of disorption modules: 741 (pair A-B), 742 (pair A'-C), and 743 pair (A"-D). Modules 741', 742' and 743' illustrate a similar cluster in the bottom half of its arc of travel. The D to C heat transfer is accomplished by thermosyphon 750, from the hot zone of module 743' to the hot zone ($T_{HH}$) Of module 742. That thermosyphon is a dual-use thermosyphon with three ends—when it is inverted as shown by 750', it transfers heat from the hot zone of module 742' to the hot zone ($T_H$) of module 741. Heat at $T_M$ is transferred from the hot zone of module 741' via integral thermosyphon 751 to where it is removed by contact with clean warm air through fixed plenum 752. If A is a solid rather than pure sorbate, then 751 would be a closed thermosyphon. Even when A is liquid, A' and/or A" may be solids. The air being warmed is furnished to cool the moderate temperature ($T_M$) ends of the modules in the upper half of their rotational arc via stationary structure 752. The module clusters are arranged such that only a single air flow path is necessary and all rotating modules being cooled to $T_M$ are traversed together. Similarly with the cool (%) air stream and stationary structure 753. In the air conditioning mode, the cooled air from 753 is supplied to the conditioned space, and 752 is supplied air from ambient. In the heating mode, those connections are reversed. For a year-round heat pump, air valves or dampers can effect the reversal, as is known in the prior art.

Figure 8A:
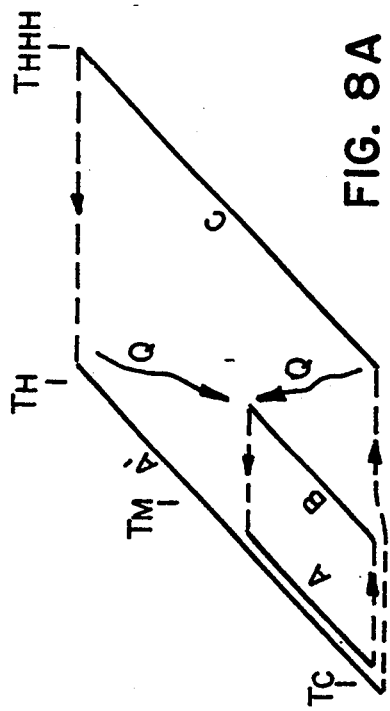
FIGS. 8A, 8B, and 8C illustrate triple effect via combination concentration and pressure staging.
Figure 8B:
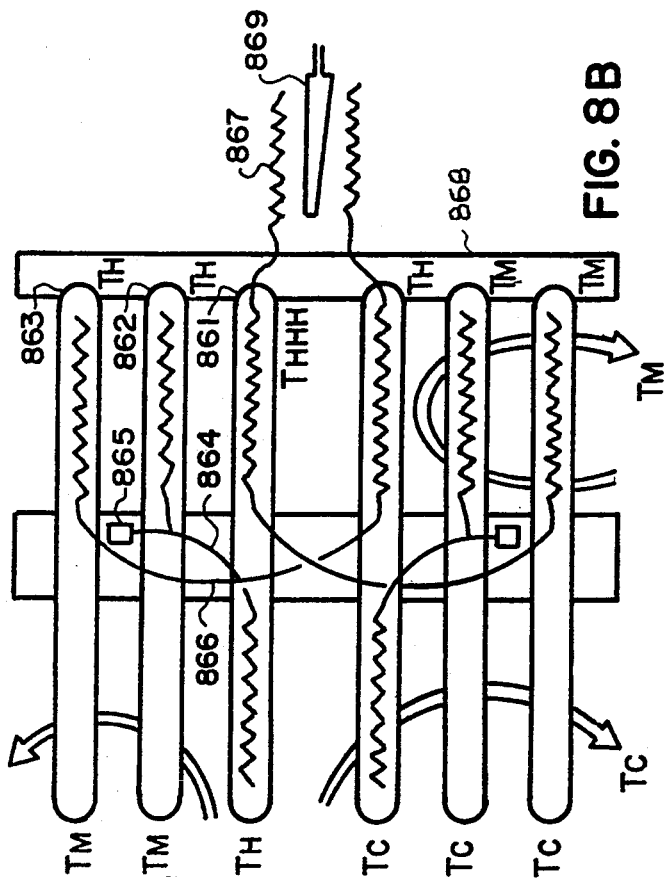
Figure 8C:
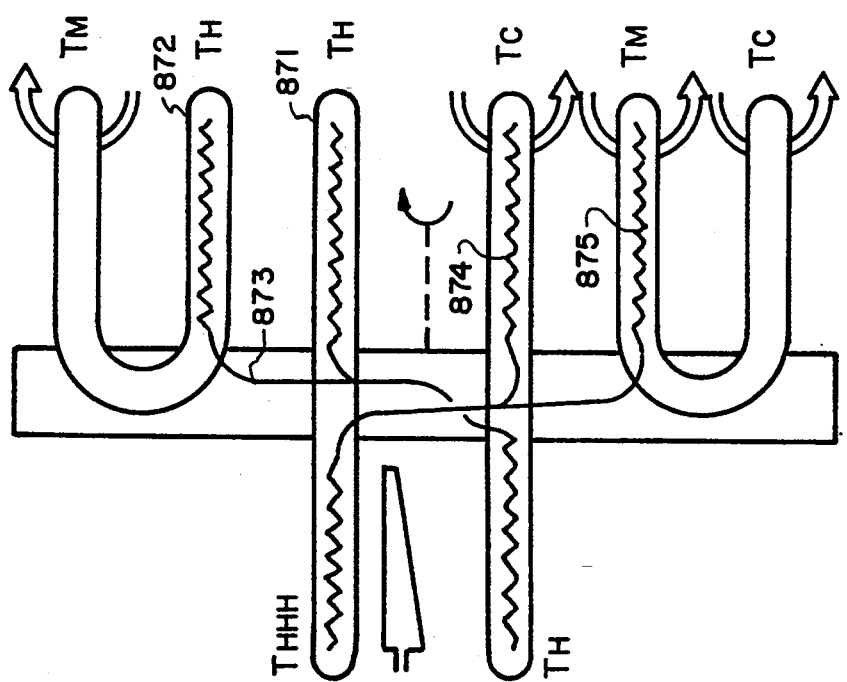

FIGS. 8A, 8B, and 8C illustrates triple effect disorption heat pumps which utilize a combination of pressure staging and concentration staging. As shown in FIG. 8A, the high affinity media B of the low temperature sorbing pair A-B is heated by two different internal latent heat sources: the low affinity media A' of sorbing pair A'-C at high pressure, and the high affinity media C at low pressure. The straightforward way of implementing this cycle is with groups of three disorption modules, one with A'-C (861) and two containing A-B (862, 863). That is shown in FIG. 8B. The internal latent heat exchange from A' to B is accomplished by thermosyphon 864, which includes reservoir 865 to allow it to turn off in the bottom half arc of its travel. The internal latent heat exchange from C to B is accomplished by thermosyphon 866. Section 867 is added to that thermosyphon to make it dual use, whereby barrier 868 prevents combustion products from burner 869 from contaminating the heat pumped air.

With multiple clusters of modules, a somewhat simpler embodiment is possible as shown in FIG. 8C. Each cluster is comprised of only two disorption modules—module 871 contains the A'-C sorbing pair, and module 872 contains the A-B pair. When modules 861 and 871 contain comparable amounts of sorbent, module 872 would contain approximately as much as modules 862 and 863 combined. This is because the B component of module 872 is being heated both by the C component of the opposite cluster and the A' component of the same cluster. Both heatings are accomplished by dual use thermosyphon 873. That thermosyphon should contain enough liquid to fill both the 874 section and 875 section when it rotates to its lower half of travel, to ensure it is turned off there; alternatively a reservoir could be provided as in FIG. 8B.

In a similar fashion, the embedded thermosyphons can be applied to rotary solid sorption heat pumps (RSSHP) comprised of a plurality of trisorption modules. In that embodiment, since the operating cycle comprises a three step sequence, each thermosyphon will associate two modules which are spaced 120° apart, vice 180° apart as with disorption modules.

I claim:

1. A rotary sorption heat pump for at least one of heating and cooling comprised of:
   a) a plurality of sorption modules, each module comprised of at least two different zones of heat and mass transfer;
   b) a mounting frame for said modules which is adapted for rotation;
   c) a plurality of thermosyphons, each thermosyphon comprised of a first portion which is in heat exchange relationship with one type of zone in at least part of said modules, and at least a second portion which is in heat exchange relationship with a different type of zone in at least part of said modules.

2. The apparatus according to claim 1 wherein one zone contains a chemisorbent, and all modules contain the same working media pair.

3. The apparatus according to claim 1 wherein there are at least two different types of modules arranged in similar clusters, and wherein at least part of said thermosyphons exchange heat between at least two different modules.

4. The apparatus according to claim 3 adapted for concentration staged operation by exchanging latent heat between high affinity ends of respective modules.

5. The apparatus according to claim 3 adapted for pressure staged operation by exchanging latent heat from the low affinity end of one module to the high affinity end of a lower temperature module.

6. The apparatus according to claim 3 adapted for both pressure and concentration staging.

7. The apparatus according to claim 1 wherein at least part of said thermosyphons incorporate a reservoir.

8. The apparatus according to claim 1 wherein at least part of said thermosyphons are integrated with a condenser/evaporator end of at least part of said modules.

9. The apparatus according to claim 1 wherein at least part of said modules are trisorption modules.

10. The apparatus according to claim 3 additionally comprised of fixed structure for air being cooled, fixed structure for air being warmed, and wherein said modules are arranged so as to have the modules being cooled in close proximity and contiguous.

11. A multi-effect solid sorption heat pump comprised of:
    a) at least two hermetically separate sorption modules which are adapted for operation in at least a two-step repeating sequence and wherein at least one of said modules is comprised of three different zones; and
    b) a means for exchanging heat between different solids in at least two of said modules during one of said steps.

12. The multieffect solid sorption heat pump according to claim 11 additionally comprised of a multiplicity of clusters of said modules arranged on a rotating frame, a heat source, fixed heat transfer fluid conduits, and wherein said module-to-module heat exchange is via thermosyphon.

13. A solid sorption heat pump (SSHP) comprised of a plurality of clusters of multisorption modules, each cluster comprised of two different types of modules, one type of module in each cluster comprised of a sorbent zone plus a condenser/evaporator zone; and the other comprised of two sorbent zones.

14. The SSHP according to claim 13, additionally comprised of a means for exchanging latent heat between at least one sorbent zone in each cluster and another zone, where the other zone can alternatively be in the same cluster or a different cluster, and can also alternatively be a sorbent zone or a condenser/evaporator zone.

15. The SSHP according to claim 14, wherein said means for heat exchange is comprised of thermosyphons.

16. The SSHP according to claim 14, wherein said means for heat exchange is comprised of a circulating heat transfer liquid.

17. The SSHP according to claim 15 additionally comprised of a rotatable frame for mounting said modules, whereby rotation causes said thermosyphons to turn on and off.

18. A rotary solid sorption heat pump (RSSHP) comprised of a plurality of clusters of multi sorption modules, each cluster comprised of at least two different modules.

19. The RSSHP according to claim 18, additionally comprised of a plurality of valveless non-reversing thermosyphons which are in heat exchange relationship with at least one of the sorbents contained in at least part of the multisorption modules.

20. The RSSHP according to claim 18, additionally comprised of sorbent containment zones of generally elongated cylindrical shape.

21. A rotary sorption heat pump for at least one of heating and cooling comprised of:
    a) a plurality of sorption modules, each module comprised of at least two different zones of heat and mass transfer;
    b) a mounting frame for said modules which is adapted for rotation;
    c) a plurality of valveless thermosyphons, each thermosyphon comprised of a first portion which is in heat exchange relation with one type of zone in at least part of said modules, and a second portion which is in heat exchange relationship with an external heat transfer fluid.

* * * * *